United States Patent Office 2,739,131
Patented Mar. 20, 1956

2,739,131

COLOR STABILIZATION OF ARYLAMINE ANTI-OXIDANTS EMPLOYING HYDROQUINONE AND DERIVATIVES THEREOF

John W. Thompson and Donald J. Shields, Kingsport, Tenn., assignors to Eastman Kodak Company, Rochester, N. Y., a corporation of New Jersey No Drawing. Application March 28, 1952, Serial No. 279,212

1 Claim. (Cl. 252—403)

This invention relates to the stabilization of aryl amino compounds comprising phenylene diamines and/or aminophenols.

Phenylene diamines and aminophenols are particularly suitable for use as gum inhibitors in organic compounds such as in unsaturated hydrocarbons and similar compounds which undergo deterioration due to reaction with oxygen. These inhibitors are generally added to gasoline in amounts of from about 0.0001% to about 0.01% by weight, the exact amount depending upon the particular gasoline being treated. The inhibitor also may be utilized in addition to various dyes, antiknock agents, such as tetraethyl lead, metal deactivators, or other additives employed for specific purposes.

Phenylene diamine derivatives, e. g. N, N'-di-sec-butyl-para-phenylene diamine, are very effective inhibitors for gasoline but have the disadvantages that, upon standing for an extended period of time, they tend to darken and thereby to impart undesirable color to gasoline. In some instances, it is desired to market a water-white gasoline and discoloration thereof due to the inhibitor is objectionable. In other instances, discoloration may cause confusion in identification of the gasoline. The U. S. Government and many refiners identify gasoline by variations of color, and discoloration of a red gasoline to purple, for example, may cause confusion in this regard. Similarly, aminophenol derivatives, e. g. N-n-butyl-para-aminophenol, are very effective gum inhibitors but also tend to discolor upon standing.

In U. S. Patent No. 2,410,847 a method is disclosed for stabilizing aromatic amines themselves, either before or after addition to gasoline. It is stated that many of the known gasoline inhibitors are ineffective and may act as pro-oxidants for such aromatic amines instead of stabilizing them. Examples of such pro-oxidants for the amino compounds are said to include 4-tertiary butyl catechol, hydroquinone, pyrogallol, etc.

We have found that hydroquinone and the various hydroquinone derivatives can be employed as color stabilizers for antioxidants such as N,N'-di-sec-butyl-p-phenylene diamine and N-n-butyl-p-aminophenol.

It is an object of our invention to provide stabilized antioxidants which resist undesirable color changes during storage prior to use. It is a further object of our invention to provide such stabilized antioxidants wherein the color stabilizer is hydroquinone or various hydroquinone derivatives.

In accordance with the present invention color-deterioration of aryl amino antioxidants of the type described above is markedly retarded by adding thereto from about 0.1% to about 10% based on the weight thereof of a compound having the following formula:

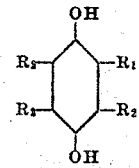

wherein $R_1$, $R_2$, and $R_3$ each represents a substituent selected from the group consisting of a hydrogen atom, an alkoxy radical containing from one to four carbon atoms, an alkyl radical containing from one to eight carbon atoms, and an aryl radical of the benzene series containing from six to nine carbon atoms. Advantageously, $R_2$ is a hydrogen atom. Furthermore, these color-stabilizing compounds are especially effective when $R_2$ is a hydrogen atom and not more than one of $R_1$ and $R_3$ is a hydrogen atom. Examples of these color-stabilizers include tertiary butylhydroquinone, phenylhydroquinone, methoxyhydroquinone, durohydroquinone, etc.

Antioxidants such as N,N'-di-sec-butyl-p-phenylenediamine and N-n-butyl-p-aminophenol darken rapidly to an objectionable brown-black color upon exposure to air. By employment of the color stabilizers described above these antioxidants possess improved color stability. The color stabilizer can be added in its pure form or as a solution in an appropriate solvent to the antioxidant. In some instances the color stabilizer can be added to the antioxidant during the production thereof. The examples given below disclose the effectiveness of these color stabilizers. Since it is convenient to employ antioxidants in the form of solutions, the following examples were conducted employing benzene solutions of the antioxidants with and without the presence of a color stabilizer.

In order to illustrate this invention, the following twelve tabulated examples (A to L) were performed employing solutions of antioxidants in benzene as a solvent. Such antioxidant solutions were prepared so as to contain 0.5 volume per cent of N,N'-di-sec-butyl-p-phenylenediamine in one instance and 0.5 volume per cent of a solution consisting of 48% by weight of N-n-p-aminophenol and 52% of isopropanol in the second instance. Three test lots of the first antioxidant solution in benzene were employed and one test lot of the second was employed. A 200 ml. sample of each of the test lots of these antioxidant solutions was exposed to air and diffused light in a 250 ml. glass bottle with daily observation of any color changes. The number of days for these antioxidant solutions to turn a dark red-brown color in the first three test lots and a dark brown color in the latter test lot is recorded in the following table. These untreated samples of the various test lots are called blank controls. Various proportions of the tabulated color stabilizers were then admixed with each of the various test lots in the proportions indicated based respectively on the weight of the antioxidant and on the weight of the antioxidant-in-isopropanol employed. These stabilized antioxidant solutions were then exposed in the same manner as the blank controls and the number of days is set forth which were required for such solutions to attain the same color as the blank controls. These data are recorded in the table wherein each of the twelve examples is identified by a letter from A to L.

Examples A to L

| Color Stabilizer | Wt. Percent of Stabilizer Based on Antioxidant | In N,N'-di-sec-Butyl-p-Phenylenediamine | | | | In N-n-Butyl-p-aminophenol |
|---|---|---|---|---|---|---|
| | | Test 1 | Test 2 | Test 3 | Average | |
| Blank Control | 0 | 6 | 8 | 9 | 8 | 10 |
| Hydroquinone | 2.6 | (A)11 | | | 11 | |
| Tert. butyl-hydroquinone | 3.9 | (B)19+ | (C)33+ | (D)20+ | 24+ | (E)15 |
| Octylhydroquinone | 5.2 | | (F)33+ | | 33+ | |
| 2,5-di-tertiary-butylhydroquinone | 5.2 | | (G)27 | (H)20+ | 23+ | (I)15 |
| Phenylhydroquinone | 4.0 | | (J)27 | | 27 | |
| Methoxy Hydroquinone | 3.3 | | (K)23 | | 23 | |
| 2,5-diethoxyhydroquinone | 4.7 | | (L)12 | | 12 | |

It is apparent from the above tabulation that hydroquinone is the least effective of the various color stabilizers tested. In addition to those color stabilizers named above, hexylhydroquinone, 2,5-di-sec-butylhydroquinone, tertiary amylhydroquinone, propoxyhydroquinone, tolylhydroquinone, xylylhydroquinone, ethoxyhydroquinone, etc. can be similarly employed. It is advantageous to employ such compounds containing alkoxy substituents which contain only one such substituent, this being indicated by the relatively low effectiveness of 2,5-diethoxyhydroquinone.

In addition to the use of benzene in forming the above-described antioxidant solutions, other solvents can be similarly employed, e. g. lower alkanols such as methanol, isopropanol, etc., aromatic hydrocarbons such as toluene, xylene, etc., etc. Such solvents can be employed in an extent such that the antioxidant is present in an amount by weight of from about 0.1% up to the limit of solubility in the solvent.

We claim:

A liquid gasoline antioxidant composition of improved color stability during storage prior to its introduction into gasoline which consists essentially of benzene in which is dissolved about 0.5 volume percent of N,N'-di-sec-butyl-p-phenylenediamine and from about 0.1 to about 10% by weight, based on said phenylenediamine, of 2,5-ditertiary-butyl hydroquinone.

References Cited in the file of this patent

UNITED STATES PATENTS

| | | |
|---|---|---|
| 2,023,110 | Wilson | Dec. 3, 1935 |
| 2,054,276 | Wilson | Sept. 15, 1936 |
| 2,461,972 | Fischer | Feb. 15, 1949 |
| 2,521,425 | Thompson | Sept. 5, 1950 |